United States Patent
Fryd et al.

(10) Patent No.: US 6,262,152 B1
(45) Date of Patent: Jul. 17, 2001

(54) PARTICLES DISPERSED W/POLYMER DISPERSANT HAVING LIQUID SOLUBLE AND CROSS-LINKABLE INSOLUBLE SEGMENTS

(75) Inventors: Michael Fryd, Moorestown; Karyn B. Visscher, Voorhees, both of NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/342,808

(22) Filed: Jun. 29, 1999

Related U.S. Application Data

(60) Provisional application No. 60/103,194, filed on Oct. 6, 1998.

(51) Int. Cl.$^7$ .............. C08K 3/08; C08K 3/20; C08K 3/22; C08K 5/07; C08L 51/00
(52) U.S. Cl. .............. 524/90; 523/205; 524/210; 524/388; 524/389; 524/391; 524/413; 524/430; 524/440; 524/441; 524/548; 524/558; 525/123
(58) Field of Search .............. 523/205; 524/533, 524/90, 210, 388, 389, 391, 413, 430, 440, 441, 548, 558; 525/123

(56) References Cited

U.S. PATENT DOCUMENTS

| | | | |
|---|---|---|---|
| 3,393,162 | * 7/1968 | Cox et al. | 523/205 |
| 3,640,863 | * 2/1972 | Okuno et al. | 523/205 |
| 3,912,677 | * 10/1975 | Baker et al. | 523/205 |
| 4,251,287 | 2/1981 | Lim et al. | 252/316 |
| 4,337,185 | 6/1982 | Wessling et al. | 524/458 |
| 4,405,744 | * 9/1983 | Greinecker et al. | 523/205 |
| 4,418,163 | * 11/1983 | Murakami et al. | 523/205 |
| 4,597,794 | * 7/1986 | Ohta et al. | 523/160 |
| 4,698,215 | * 10/1987 | Albanesi et al. | 523/205 |
| 4,798,691 | 1/1989 | Kasai et al. | 264/47 |
| 4,798,786 | 1/1989 | Tice et al. | 435/177 |
| 4,931,284 | 6/1990 | Ekman et al. | 424/450 |
| 4,935,456 | 6/1990 | Huang et al. | 523/201 |
| 4,985,166 | 1/1991 | Leising et al. | 252/62.54 |
| 5,162,189 | 11/1992 | Pierce et al. | 430/126 |
| 5,225,278 | 7/1993 | Kielbania, Jr. et al. | 428/402.22 |
| 5,417,890 | 5/1995 | Epron et al. | 252/500 |
| 5,521,253 | 5/1996 | Lee et al. | 525/301 |
| 5,618,888 | 4/1997 | Choi et al. | 525/301 |
| 5,629,401 | 5/1997 | Graiver et al. | 528/43 |
| 6,051,060 | * 4/2000 | Mizobuchi | 523/205 |
| 6,057,384 | * 5/2000 | Nguyen et al. | 523/160 |
| 6,080,802 | * 6/2000 | Emmons et al. | 523/205 |
| 6,096,802 | * 8/2000 | Lark | 523/205 |
| 6,117,921 | * 9/2000 | Ma et al. | 524/533 |

FOREIGN PATENT DOCUMENTS

| | | |
|---|---|---|
| 0 340 976 A2 | 11/1989 | (EP) . |
| 0 540 757 A1 | 5/1993 | (EP) . |
| 0 722 994 A1 | 7/1996 | (EP) . |
| 0 775 596 | 5/1997 | (EP) . |
| 1035445 | * 6/1966 | (GB) . |
| 55-139471 | * 10/1980 | (JP) . |

* cited by examiner

Primary Examiner—Robert E. L. Sellers
(74) Attorney, Agent, or Firm—Joseph A. Tessari

(57) ABSTRACT

Dispersions containing a liquid vehicle (which can be aqueous, semi-aqueous or non-aqueous), organic or inorganic particles (or mixtures) that are insoluble in the liquid vehicle and a polymeric dispersant, preferably a structured polymeric dispersant, having one or more segments soluble in the liquid vehicle and one or more segments insoluble in the liquid vehicle, have improved stability when the insoluble segment(s) contains cross-linking groups which are cross-linked to itself or a cross-linking compound such as a polyfunctional monomer, oligomer or polymer to form an encapsulation network that entraps the particles which are particularly useful for paints or inks in coating and printing applications.

8 Claims, No Drawings

PARTICLES DISPERSED W/POLYMER DISPERSANT HAVING LIQUID SOLUBLE AND CROSS-LINKABLE INSOLUBLE SEGMENTS

This application claim benefit to U.S. provisional 60/103194 filed Oct. 6, 1998.

BACKGROUND OF THE INVENTION

This invention relates to dispersions of particles in a liquid vehicle and, more particularly, to dispersions in which the particles are entangled in a cross-linked polymer matrix.

Dispersions of particles in a liquid vehicle are commonly used in a wide variety of industries and processes, such as coatings (e.g., paint and ink), magnetic or optical recording media (e.g., tapes and disks), cosmetics (e.g., lipsticks and nail polish); agriculture (e.g., insecticides), pharmaceutical preparations and many others. In addition, in a concentrated form (such as can be obtained by centrifugation followed by decanting the supernatant liquid) the dispersions are useful for tinting, coloring fibers, coloring molded resins, for adding pigment to flexographic plates and a variety of other applications.

As expected, these dispersions are very diverse. Generally speaking, however, these dispersions all contain a liquid vehicle (such as water, an organic solvent, or a combination of the two) and some type of particle (such as a pigment, a pharmaceutically active compound, metallic flakes, hollow glass spheres, discrete polymer particles, etc.). Typically, but not always, a dispersant is used to help maintain the particles in a suspended state in the liquid vehicle; i.e., prevent the particles from settling out of the liquid. In many instances, the dispersant used is a polymer.

There has been significant effort in the art directed at improving the stability of the dispersions so that the particles are less likely to settle out of the liquid under a defined set of conditions. The reason for the effort is that a dispersion with improved stability can translate into products having a longer shelf life; products that can survive more rigorous storage conditions (e.g., extreme temperature cycles); products that are easier or less expensive to transport or handle during use; and products that are more uniform and consistent in quality, and products that offer greater formulation latitude.

The effort to improve dispersion stability to date have included improvements in the processes used to make the dispersions, the development of new dispersants and the exploration of the interaction between dispersants and particular liquid vehicle formulations. Recently, there has been a good deal of research directed at modifying the particles, especially the particle surface, in order to improve the dispersion stability. For instance, recent advances in the art have seen the advent of coated particles, particles whose surfaces have been chemically modified, and particles that are covalently bonded to a dispersant.

While much of the effort has had general application at improving dispersion stability, some of that effort has not found utility in particular applications. For example, pigment dispersions used in ink jet printing applications have very unique and demanding requirements. Ink jet printing is a non-impact and non-contact printing process in which an electronic signal produces droplets of ink that are deposited on a wide variety of substrates such as paper, transparent film, plastics, metals and fabrics. Typically, the ink is ejected from a printhead containing a plurality of very small nozzles using thermal or piezoelectric ejection technology. In ink jet printing, it is critical that the ink components remain stable, not only in storage but also over repeated firing cycles; that they not interact with the components used to manufacture the printhead; that they not clog the nozzle openings; and that they not for a film on the orifice plate or resistors used in the printhead. In addition, because such printing is often used in an office environment, such inks tend to be aqueous based dispersions.

SUMMARY OF THE INVENTION

In the broadest sense, the present invention provides a dispersion of particles in a liquid vehicle, comprising:
- (a) a liquid vehicle selected from the group consisting of water, organic solvents and combinations thereof;
- (b) particles that are at least substantially insoluble in the liquid vehicle;
- (c) a polymer dispersant having at least one segment soluble in the liquid vehicle and at least one segment insoluble in the liquid vehicle,
- (d) wherein said at least one insoluble segment has cross-linking moieties that are cross-linked to at least one cross-linkable component which is at least substantially insoluble in the liquid medium and is selected from the group consisting of itself, a polyfunctional monomer, a polyfunctional oligomer, and a polyfunctional polymer to form an encapsulation network which entraps the particles.

In further embodiments, the dispersion may also contain a catalyst to facilitate the cross-linking reaction. The particles may be organic or inorganic and the particles may or may not be covalently bonded to the dispersant.

DETAILED DESCRIPTION OF THE EMBODIMENTS

The dispersions of this invention essentially comprise a liquid vehicle, particles and a dispersant polymer that has been cross-linked to entrap the particles. In further embodiments the dispersion may contain a cross-linking component and catalysts. Depending on the ultimate use of the dispersions, various additives and adjuvants may be used in the dispersion as is common in the particular application of interest.

Liquid Vehicle

The liquid vehicle, while an essential component of the invention, may be aqueous or non-aqueous and may contain water, organic solvents or combinations thereof. The particular type and amount of liquid will be readily determined by the particular end use of the dispersions. For example, the paint industry utilizes both solvent based and aqueous based paints, stains and coatings. In ink jet ink applications, the vehicle typically comprises a mixture of water and at least one water soluble organic solvent, most commonly a pyrrolidone or a polyhydric alcohol, or both. Generally speaking, there is a strong preference (for environmental, cost and health and safety reasons) to utilize aqueous based dispersions wherever possible. Accordingly, an aqueous based liquid vehicle (i.e., a liquid vehicle comprising at least 50% by weight of water) is a preferred embodiment of the present invention.

Particles

Although particles are required for the invention, the type and composition of the particles is not particularly critical and will largely depend upon the ultimate end use application of the dispersion. By definition, the particles are at least substantially insoluble in the liquid vehicle. If they were soluble, the resulting mixture would be a solution rather than a dispersion. Apart from that general limitation, the particles may be organic, inorganic or mixtures thereof. Examples of suitable particles include pigments, insoluble dyes, metallic particles, biologically active compounds, pharmaceutically active compounds, polymer particles, hollow glass spheres, etc.

The particle size can have an effect on dispersion stability. In general, smaller particles tend to create more stable dispersions in that Brownian motion helps to prevent the particles from flocculating or settling. Small particle size pigments also produce maximum color strength and there fore may be desirable in applications using pigment dispersions. The particle size will vary substantially depending upon the desired end use for the dispersion. For ink jet ink applications, for example, a useful particle size will be in the range of 0.005 to 15 microns. For paints, the particle size may be as high as 75 to 100 microns and in other coatings the particles may be up to several hundred microns. One of ordinary skill in the art can readily determine the appropriate particle size for the desired application.

Fine particles of metal (such as copper, iron, steel, aluminum and alloys) or metal oxides (e.g., silica, alumina, titania) may be used to practice the invention. For example, metal and metal oxides are suitable for the preparation of magnetic and/or optical recording media. In addition, some coating applications might utilize metallic flakes in combination with pigments to provide a "pearl-like" finish.

The amount of particles used in the dispersion is not critical to the invention and can be as desired for the end use application. For instance, paints, inks and cosmetics may require significantly greater particle concentrations on a weight basis compared to dispersions of highly reactive pharmaceutical or agricultural compounds. In a preferred embodiment, the particles comprise pigments.

Polymer Dispersant:

The function of the polymeric dispersant is to disperse the insoluble particles in the liquid vehicle. Structured polymers are particularly preferred. The term "structured polymer" means any polymer that does not have a random structure. Stated differently, the term "structured polymer" means that the polymer has identifiable and defined segments or areas based on the type, identity and/or behavior of the monomers contained within the segment or area. Typically, but not always, those segments are characterized as being hydrophobic or hydrophilic.

Examples of structured polymers include block polymers, graft polymers, tapered polymers and branch polymers. Particularly preferred structured polymeric dispersants for use in the present invention are block and graft copolymers. Structured polymers are particularly preferred because it is easier to produce segments having the desired functionality in such polymers versus random polymers. Graft polymers having an insoluble backbone and soluble arms are particularly preferred. Such polymers can be prepared by techniques well known in the art. For example, block polymers can be made using the well known Group Transfer Polymerization technique and graft polymers may be prepared using chain transfer agents. Specific conditions for preparing particularly preferred polymers are set forth in the examples.

Regardless of the structure of the polymer dispersant, it must contain one or more segments that are soluble in the liquid vehicle and one or more segments that are insoluble in the vehicle. As such, the polymer has an area or segment that has an affinity for the liquid vehicle and an area or segment that has an aversion for the liquid vehicle. When the polymer is placed into the liquid, it will naturally tend to orient itself such that the segment(s) with aversion to the liquid is/are clustered together to form a liquid adverse "core" and the segment(s) with affinity for the vehicle are aligned away from the core. The particles, which are insoluble and thus also have an aversion for the liquid, tend to migrate into the "core" formed by the polymer alignment.

Generally speaking, the insoluble particle is relatively content to stay isolated in this liquid free "core". Under certain conditions, however, such as changes in temperature, changes in composition of the liquid vehicle, etc. the particles tend to move out of the core where they can flocculate and precipitate. The present invention addresses this problem by cross-linking the insoluble polymer segment to form a network or matrix around the particle which is extremely resistant to changes in liquid vehicle composition, temperature and other factors known to destabilize dispersions. The particle is entrapped in a network formed by the insoluble polymer segment and the cross-linking bonds 24. The cross-linking bonds are very stable and effectively prevent the particle from leaving the "core" formed by the polymer. The soluble segment of the polymer remains aligned into the liquid vehicle and away from the liquid adverse "core". It is not necessary that the particle be covalently bonded to the polymer dispersant to obtain the improved dispersion stability. However, although not illustrated, it is understood that the dispersions of the present invention do not preclude situations where the particle, in addition to being entrapped in the cross-linked matrix, would also be covalently bonded to the polymer.

The monomer composition of the soluble segment and the insoluble segment of the dispersant will, of course, depend upon the liquid vehicle selected for the dispersion. If an aqueous vehicle is selected, the soluble segment will contain hydrophilic monomers and the insoluble segment will contain hydrophobic monomers. If a non-aqueous vehicle (that is, one containing primarily organic solvents) is selected, the opposite would be true. Therefore, for ease of reference, the useful monomers can be classified generally as hydrophobic or hydrophilic and will be so categorized herein. It is also possible to introduce solubility by making a salt of the monomers used in the soluble segment, particularly for aqueous dispersions, as is known in the art. Whatever the precise composition of the soluble segment may be, it is important that this segment be such that the entire polymer dispersant (or a salt thereof) is soluble in the liquid vehicle.

Hydrophobic and hydrophilic monomers are well known to those skilled in the art. Particularly useful hydrophobic monomers (which are soluble in a non-aqueous vehicle) include:

1) alkyl, aryl, and alkyl aryl acrylates or methacrylates having 1–12 carbon atoms in the alkyl group and/or 6–12 carbons in the aryl group such as methyl, ethyl, butyl, propyl, isobutyl, hexyl 2-ethyl hexyl, nonyl, lauryl, isobornyl, benzyl acrylates and methacrylates and the like;

2) polymerizable vinyl aromatic monomers such as styrene, alpha methyl styrene, vinyl toluene and the like; and 3) aliphatic hydrocarbon monomers such as isoprene and butadiene.

Particularly useful hydrophilic monomers (i.e., those which can impart water-solubility) include: (1) acid monomers such as acrylic acid, methacrylic acid, acrylamidomethylpropane sulfonic acid, itaconic acid, maleic acid and styrene sulfonic acid; (2) amine-containing monomers such as 2-dimethylaminoethyl methacrylate, 2-dimethylaminoethyl acrylate, 2-diethylaminoethyl methacrylate, and 2-diethylaminoethyl acrylate; and (3)

monomers having oligoether moieties of the general formula:

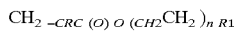

wherein R=H or methyl; $R_1$=alkyl of 1 to 4 carbon atoms, aryl of 6 to 12 carbon atoms, or alkyl-aryl, and n=1 to 20, examples of which include ethoxyethyl methacrylate, butoxyethyl methacrylate, ethoxytriethylene methacrylate, methoxy-polyethylene glycol methacrylate, and 2-ethoxytriethylene glycol methacrylate.

It may be necessary to neutralize the monomers to make them soluble. Suitable reagents to neutralize the acid monomers include mono-, di-, tri-methylamine, morpholine, n-methyl morpholine; alcohol amines such as dimethylethanolamine (DMEA), methyldiethanolamine, mono-, di-, and tri-ethanolamine; pyridine; ammonium hydroxide; tetra-alkylammonium salts such as tetramethylammonium hydroxide, tetraethyl-ammonium hydroxide; alkali metals hydroxides such as lithium, sodium and potassium hydroxide, aminopropanol, etc. The amine monomers may be neutralized with inorganic and organic acid such as acetic acid, formic acid, oxalic acid, dimethylol propionic acid, hydrochloric acid, p-toluene sulfonic acid, benzene sulfonic acid, nitric acid, citric acid, and the like; halogens such as chloride, fluoride, and bromide, and inorganic acids, such as sulfuric acid, nitric acid, phosphoric acid and the like. It is also possible to convert the amino group into a tetra-alkyl ammonium salt. Alternatively, the amine functionalities can be rendered water-soluble by quaternization with reagents such as benzyl chloride, dimethylsulfate, methyl chloride, etc.

Depending on the number, n, of oxyethylene units in the monomers containing oligoether moieties, the polymer can be slightly or completely water soluble. The solubility of the polymer increases as the number of oxyethylene units increases. The monomers having oligoether moieties can be advantageously used to adjust the physical properties, such as Tg, of the polymer dispersant.

In accordance with the invention, the insoluble segment (s) of the polymer have cross-linkable functional moieties. The insoluble segment(s) of the dispersant is thus capable of cross-linking to itself or to an additional cross-linking compound (e.g., monomer, oligomer, or polymer) that has suitable cross-linking functionality. Table 1 identifies suitable functional groups that may be incorporated into the insoluble segment of the dispersant and the companion cross-linking group that may be present in the cross-linking compound.

TABLE 1

| FUNCTIONAL GROUP | CROSS-LINKING GROUP |
|---|---|
| epoxy | amine, anhydride, acid, phenolic, hydroxyl, N-methylol, aldehyde, acetoacetoxy |
| hydroxyl | isocyanate, epoxide, N-methylol, anhydride, ester |
| anhydride | epoxide, amine, hydroxyl |
| acid | epoxide, N-methylol, isocyanate |
| cyclic carbonate | amine |
| activated allyl | amine, radical initiator |
| amine | aldehyde, epoxide, anhydride, isocyanate, ester, acetoacetoxy, activated allyl |
| silane, silicate, silanol, silicone | hydroxyl, water, acid, isocyanate, silane, silicate |
| imine | aldehyde, epoxide, anhydride, isocyanate, ester, acetoacetoxy, activated allyl |

Particularly preferred cross-linking combinations are the epoxy moieties with amines, hydroxyl moieties with isocyanates and silane moieties with themselves. As noted above, the functional group and the cross-linking group can be incorporated into the insoluble segment(s) of the polymer dispersant by selection of appropriate monomers or, preferably, a separate cross-linking compound having the appropriate group is added to the dispersion. Useful cross-linking compounds are those which are insoluble in the liquid vehicle and which do not have significant reaction with the major component of the liquid vehicle. For aqueous dispersions useful cross-linking compounds include diacrylate, diisocyanate, m-tetramethylxylene diisocyanate ("m-TMXDI"), hexamethylene diisocyanate trimer ("HMDI") and isophorone diisocyanate trimer ("IPDI"). m-TMXDI is particularly preferred.

The dispersions of the present invention are made in essentially the same manner as dispersions in the prior art. The particles are premixed with the selected dispersant and then charged to a suitable dispersion apparatus (e.g., a media mill, attritor, 2-roll mill, etc.) and thoroughly mixed. The cross-linking reaction then takes place and the cross-linking compound (if used) is added to the mixture. To facilitate the cross-linking reaction, it may be desirable to add a catalysts and/or to elevate the temperature of the mixture. Useful catalysts can be those that are either soluble or insoluble in the liquid and are selected depending upon the cross-linking groups. For isocyanate—hydroxy type cross-linking reactions, suitable catalysts include (for aqueous systems) dibutyltin dilaurate ("DBTDL"), tributyl amine ("TBA"), trioctyl amine, tridodecyl amine and dimethyldodecyl amine. DBTDL and TBA are particularly preferred for aqueous dispersions. For non-aqueous systems, 2,2,2-diaminobicyclooctane ("DABCO") may be used as the catalyst.

Other Ingredients

The dispersions of this invention may also contain other ingredients or additives depending on the particular end use. For example, surfactants are commonly used in coatings such as paint or inks to alter surface tension as well as maximize penetration into the substrate (for ink applications in particular). Normally, care must be taken in selecting the surfactant, however, because the surfactant can compete for the particles (i.e., pigments) and thus may destabilize the dispersion. The entrapment of the particles in accordance with the present invention, however, should permit greater latitude in selecting surfactants.

Biocides are also commonly used in dispersions to inhibit growth of microorganisms. Sequestering agents, such as EDTA, are also commonly used to eliminate deleterious effects of heavy metal impurities. Other common additives include humectants, viscosity modifiers, binders, coating aides, thickeners and the like, depending on the desired end use of the dispersion.

EXAMPLES

The invention will now be further illustrated by, but not limited to, the following examples, in which parts and percentages are by weight unless otherwise noted.

Example 1

This Example describes the synthesis, dispersion and encapsulation of a graft copolymer with anionic hydrophilic arms, and a hydrophobic backbone.

A macromonomer was prepared by charging the following components to a 2 liter flask equipped with a thermocouple, stirrer, dropping funnels, reflux condenser, and the means for bubbling nitrogen through the reaction.

|  | Parts |
| --- | --- |
| Portion 1 | |
| Methyl methacrylate monomer | 140.92 |
| Methacrylic acid monomer | 61.60 |
| Isopropanol | 259.80 |
| Portion 2 | |
| Methylethyl ketone | 8.04 |
| Isopropanol | 18.76 |
| Isopropyl-bis(borondifluoro-dimethylglyoximato) cobaltate (III) ("DMG Co(III)") catalyst | 0.02 |
| VAZO ®-52 Initiator | 0.20 |
| Portion 3 | |
| Isopropanol | 15.60 |
| Portion 4 | |
| DMG Co (III) Catalyst | 0.04 |
| VAZO ®-52 Initiator | 2.20 |
| Methylethyl ketone | 24.06 |
| Isopropanol | 56.14 |
| Portion 5 | |
| Methyl methacrylate monomer | 90.10 |
| Methacrylic acid monomer | 92.40 |

Portion 1 was heated to its reflux temperature in about 15 minutes. Portion 2 was thoroughly mixed and added all at once and the composition was held at its reflux temperature for 5 minutes. The vessel which contained Portion 2 was rinsed with Portion 3, which was then added to the reaction vessel. Portions 4 and 5 were added simultaneously to the reaction vessel while the vessel maintained its reflux temperature. For Portion 4, the first 54.8% was added over 90 minutes, and the remaining 45.2% was added over 240 minutes. For Portion 5, the first 67% was added over 120 minutes and the remaining 33% was added over an additional 120 minutes. After Portions 4 and 5 have been added to the vessel, the reaction is held at reflux for an additional 45 minutes and then cooled to room temperature.

The resulting macromonomer solution has a solids content of approximately 50%, and contained 60% methyl methacrylate and 40% methacrylic acid. This polymer has an approximate weight average molecular weight of 3100, and number average molecular weight of 2000.

A graft copolymer was then prepared from the macromonomer by charging the following components to a 10 liter flask equipped as above:

|  | Parts |
| --- | --- |
| Portion 1 | |
| Macromonomer (prepared above) | 3079.00 |
| 2-Ethylhexyl acrylate monomer | 206.11 |
| Hydroxyethyl acrylate monomer | 227.81 |
| Isopropanol | 600.00 |
| Portion 2 | |
| tertbutylperpivalate (Lupersol ®-11) | 25.95 |
| Isopropanol | 75.51 |
| Portion 3 | |
| 2-Ethylhexyl acrylate | 1511.49 |
| Hydroxyethyl acrylate | 1679.59 |

-continued

|  | Parts |
| --- | --- |
| Portion 4 | |
| VAZO ®-52 initiator | 25.95 |
| Methylethyl ketone | 24.51 |
| Isopropanol | 235.05 |
| Portion 5 | |
| VAZO ®-52 Initiator | 51.90 |
| Methylethyl ketone | 62.46 |
| Isopropanol | 149.59 |

Portion 1 was heated to reflux temperature over a period of approximately 20 minutes. Portion 2 was mixed and charged to the reactor in two equal portions. After the first was added, the reaction was held at reflux for 10 minutes before the second half was added. After the second half of Portion 2 was added, the reaction was held at reflux for 10 minutes. Portions 3 and 4 were added simultaneously to the reaction vessel while maintaining a reflux in the reaction vessel. Portion 3 was added over 180 minutes, and Portion 4 was added over 240 minutes. After the additions of Portions 3 and 4 were completed, Portion 5 was added to the reaction vessel over 15 minutes, maintaining the reflux temperature. After the addition of Portion 5 was completed, the reaction mixture was maintained at reflux for 120 minutes and then cooled to room temperature.

The resulting graft copolymer solution had a solids content of approximately 63% by weight and had the following overall approximate composition: 33.25% 2-ethylhexyl acrylate; 36.75% hydroxyethyl acrylate; 18% methyl methacrylate and 12% methacrylic acid. This material had a weight average molecular weight of approximately 21,000 and a number average molecular weight of approximately 7800.

A waterborne pigment dispersion was prepared by charging the following constituents into an 01-Attritor media mill:

|  | Parts |
| --- | --- |
| Portion 1 | |
| Graft copolymer prepared above | 54.44 |
| 2-amino-2-methyl-1-propanol ("AMP") | 5.31 |
| Deionized water | 237.75 |
| Portion 2 | |
| Quinacridone magenta pigment | 52.50 |
| Zirconia media (0.8–1.0 mm) | 850.00 |

The graft copolymer is mixed with the neutralizing agent (AMP) and deionized water to form Portion 1. The material from Portion 1 was mixed with the materials in Portion 2 and the constituents were ground for 16 hours at 500 rpm in an 01-Attritor at 100° F. A uniform, transparent, waterborne pigment dispersion was formed that was stable and deflocculated and had a pH range of 7.5–8.5. This dispersion contains 15% pigment and 10% polymer.

This material was used in an encapsulation reaction that involves a crosslinking reaction between hydroxyl groups in the backbone and a hydrophobic diisocyanate/catalyst system.

| Ingredient | Amount |
| --- | --- |
| Waterborne dispersion prepared above (10% polymer, 15% pigment) | 20.00 g |
| m-Tetramethylxylene diioscyanate crosslinker (isocyanate:OH = 0.4:1.0) | 0.34 g |
| Dibutyltin dilaurate (100% solution) | 1 drop |

The above ingredients were mixed together and heated at 40–50° C., with efficient stirring, for a period of 6 hours. After this time period, the mixture is cooled to room temperature and tested for flocculation stability. Samples of both the encapsulated, and unencapsulated pigment dispersions were tested for flocculation stability by adding 0.5 g of the sample to different concentrations of an incompatible vehicle, such as butyl cellosolve in water, which would flocculate the unencapsulated dispersion. The encapsulated samples were stable in much more aggressive vehicle formulations (often in 100% butyl cellosolve).

Example 2

This Example describes the synthesis, dispersion and encapsulation of a graft co-polymer with nonionic hydrophilic arms, and a hydrophobic backbone.

The following components were charged into a 1 liter flask equipped as above to form a graft copolymer solution:

|  | Parts |
| --- | --- |
| Portion 1 | |
| Bisomer S20W (a polyethyleneglycol methacrylate, 49% solids in water, Mn = 2000, available from International Specialty Chemicals) | 37.93 |
| Hydroxyethyl acrylate | 6.56 |
| n-Butyl acrylate | 5.93 |
| Isopropanol | 191.94 |
| Portion 2 | |
| n-Butyl acrylate | 43.52 |
| Hydroxyethyl acrylate | 48.10 |
| Bisomer S20W | 278.17 |
| Portion 3 | |
| VAZO ®-52 Initiator | 1.31 |
| Methylethyl ketone | 1.24 |
| Isopropanol | 21.97 |
| Portion 4 | |
| VAZO ®-52 initiator | 2.62 |
| Methylethyl ketone | 3.15 |
| Isopropanol | 7.56 |

Portion 1 was heated to reflux temperature over a period of approximately 20 minutes. Portions 2 and 3 were added simultaneously to the reaction vessel while maintaining a reflux in the reaction vessel. Portion 2 was added over 180 minutes, and Portion 3 was added over 240 minutes. After the additions of Portions 2 and 3 were completed, Portion 4 was added to the reaction vessel over 15 minutes, maintaining the reflux temperature. After the addition of Portion 4 was completed, the reaction mixture was maintained at reflux for 120 minutes and then cooled to room temperature.

The resulting graft copolymer solution had a solids content of approximately 40% by weight and had the following overall approximate composition: 19% n-butyl acrylate; 21% hydroxyethyl acrylate; and 60% Bisomer S20W. This material had a weight average molecular weight of approximately 12300 and a number average molecular weight of approximately 5700.

A waterborne pigment dispersion was prepared by charging the following constituents into an 01-Attritor media mill:

|  | Parts |
| --- | --- |
| Portion 1 | |
| Graft copolymer prepared above | 87.98 |
| Deionized water | 209.52 |
| Portion 2 | |
| Quinacridone magenta pigment | 52.50 |
| Zirconia media (0.8–1.0 mm) | 850.00 |

The graft copolymer is mixed with the deionized water to form Portion 1 (no neutralizing agent is needed). The material from Portion 1 was mixed with the materials in Portion 2 and the constituents were ground for 16 hours at 500 rpm in an 01-Attritor at 100° F. A uniform, transparent, waterborne pigment dispersion was formed that was stable and deflocculated and had a pH range of 2–4. This dispersion contains 15% pigment and 10% polymer.

This material was used in an encapsulation reaction that involves a crosslinking reaction between hydroxy groups in the backbone and a hydrophobic dissocyanate/catalyst system.

| Ingredient | Amount |
| --- | --- |
| Waterborne dispersion prepared above (10% polymer, 15% pigment) | 20.00 g |
| m-Tetramethylxylene diisocyanate crosslinker (isocyanate:OH = 0.4:1.0) | 0.34 g |
| Dibutyltin dilaurate (100% solution) | 1 drop |

The above constituents mixed together and heated at 40–50° C., with efficient stirring, for a period of 6 hours. After this time period, the mixture is cooled to room temperature and tested for flocculation stability. Samples of both the encapsulated and unencapsulated pigment dispersions were tested for flocculation stability as in Example 1. The encapsulated samples were stable in much more aggressive vehicle formulations compared to the unencapsulated samples.

Example 3

This Examples describes the synthesis, dispersion and encapsulation of a graft copolymer with cationic hydrophilic arms, and a hydrophobic backbone.

The following components were charged into a 1 liter flask equipped as above to form a graft copolymer solution:

|  | Parts |
| --- | --- |
| Portion 1 | |
| Dimethylaminoethyl methacrylate ("DMABMA") macromonomer (50.6% solids; MW = 8000; containing about 51 DMAEMA units) | 29.60 |
| Hydroxyethyl acrylate | 18.25 |

-continued

|  | Parts |
|---|---|
| 2-Ethylhexyl acrylate | 16.51 |
| Isopropanol | 60.88 |
| Portion 2 | |
| Luperisol ®- 11 initiator | 2.08 |
| Isopropanol | 6.05 |
| Portion 3 | |
| 2-Ethylhexyl acrylate | 121.07 |
| Hydroxyethyl acrylate | 134.53 |
| DMAEMA macromonomer | 217.03 |
| Portion 4 | |
| VAZO ®-52 initiator | 2.08 |
| Methylethyl ketone | 1.96 |
| Isopropanol | 18.83 |
| Portion 5 | |
| VAZO ®-52 initiator | 4.16 |
| Methylethyl ketone | 5.00 |
| Isopropanol | 11.98 |

Portion 1 was heated to reflux temperature over a period of approximately 20 minutes. Portion 2 was added to Portion 1 in two equal portions 10 minutes apart. After the second half of Portion 2 has been added, the reaction is held at reflux for 10 minutes. Portions 3 and 4 were added simultaneously to the reaction vessel while maintaining a reflux. Portion 3 was added over 180 minutes, and Portion 4 was added over 240 minutes. After the additions of Portions 3 and 4 were completed, Portion 5 was added to the reaction vessel over 15 minutes, maintaining the reflux temperature. After the addition of Portion 5 was completed, the reaction mixture was maintained at reflux for 120 minutes and then cooled to room temperature.

The resulting graft copolymer solution had a solids content of approximately 65% by weight and had the following overall approximate composition: 33% 2-ethylhexyl acrylate; 37% hydroxyethyl acrylate; and 30% DMAEMA macromonomer. This material had a weight average molecular weight of approximately 7337 and a number average molecular weight of approximately 3252.

A waterborne pigment dispersion was prepared by charging the following constituents into an 01-Attritor media mill:

|  | Parts |
|---|---|
| Portion 1 | |
| Graft copolymer prepared above | 54.09 |
| 0.1N HCl water solution | 243.40 |
| Portion 2 | |
| Quinacridone magenta pigment | 52.50 |
| Zirconia media (0.8–1.0 mm) | 850.00 |

The graft copolymer is neutralized with the 0.1N HC 1 to form Portion 1. The material from Portion 1 was mixed with the materials in Portion 2 and the constituents were ground for 16 hours at 500 rpm in an 01-Attritor at 100° F. A uniform, transparent, waterborne pigment dispersion was formed that was stable and deflocculated and had a pH range of 2–4. This dispersion contains 15% pigment and 10% polymer.

This material was used in an encapsulation process involving a crosslinking reaction between hydroxyl groups in the backbone and a hydrophobic diisocyanate/catalyst system.

| Ingredient | Amount |
|---|---|
| Waterborne dispersion prepared above (10% polymer, 15% pigment) | 20.00 g |
| m-Tetramethylxylene diisocyanate crosslinker (isocyanate:OH = 0.4:1.0) | 0.28 g |
| Dibutyltin dilaurate (100% solution) | 1 drop |

The above constituents mixed together and heated at 40–50° C., with efficient stirring, for a period of 6 hours. After this time period, the mixture is cooled to room temperature and tested for flocculation stability as in Example 1. The encapsulated samples were more stable than the non-encapsulated samples.

Example 4

This Example describes the synthesis, dispersion and encapsulation of a block copolymer with an anionic hydrophilic block, and a hydrophobic block.

The following components were charged into a 1 liter flask equipped as above to form a graft copolymer solution:

|  | Parts |
|---|---|
| Portion 1 | |
| MMA/MAA macromonomer (from Example 1) | 227.09 |
| Isopropanol | 60.00 |
| Portion 2 | |
| Luperisol ®-11 initiator | 0.24 |
| Portion 3 | |
| 2-Ethylhexyl methacrylate | 126.68 |
| Hydroxyethyl methacrylate | 140.01 |
| Portion 4 | |
| VAZO ®-52 Initiator | 3.08 |
| Isopropanol | 74.50 |

Portion 1 was placed in the reactor and heated to reflux temperature over a period of approximately 20 minutes. Portion 2 was added to Portion 1 as a single shot and the reaction was held for 5 minutes. Portions 3 and 4 were each mixed thoroughly and added simultaneously to the reaction vessel while maintaining a reflux in the reaction vessel. Portion 3 was added over 240 minutes, and Portion 4 was added over 270 minutes. After the additions of Portions 3 and 4 were completed, the reaction mixture was maintained at reflux for at least 30 minutes and then cooled to room temperature.

The resulting block copolymer solution had a solids content of approximately 60% by weight and had the following overall approximate composition: 33% 2-ethylhexyl methacrylate; 36% hydroxyethyl methacrylate; 18% methyl methacrylate and 12% methacrylic acid.

A waterborne pigment dispersion was prepared by charging the following constituents into an 01-Attritor media mill:

|  | Parts |
| --- | --- |
| Portion 1 | |
| Graft copolymer prepared above | 58.54 |
| AMP | 7.15 |
| Water | 231.81 |
| Portion 2 | |
| Quinacridone magenta pigment | 52.50 |
| Zirconia media (0.8–1.0 mm) | 850.00 |

The graft copolymer is neutralized with AMP to form Portion 1. The material from Portion 1 was mixed with the materials in Portion 2 and the constituents were ground for 16 hours at 500 rpm in an 01-Attritor at 100° F. A uniform, transparent, waterborne pigment dispersion was formed that was stable and deflocculated and had a pH range of 2–4. This dispersion contains 15% pigment and 10% polymer.

This material was then used in an encapsulation reaction involving a crosslinking reaction between hydroxyl groups in the hydrophobic block and a hydrophobic diisocyanate/catalyst system.

| Ingredient | Amount |
| --- | --- |
| Waterborne dispersion prepared above (10% polymer, 15% pigment) | 20.00 g |
| m-Tetramethylxylene diisocyanate crosslinker (isocyanate:OH = 1.0:1.0) | 0.7 g |
| Dibutyltin dilaurate (100% solution) | 1 drop |

The above constituents mixed together and heated at 40–50° C., with efficient stirring, for a period of 6 hours. After this time period, the mixture is cooled to room temperature and tested for flocculation stability as in Example 1, with the same results.

Example 5

This Example describes the synthesis, dispersion and encapsulation of a random, linear copolymer containing the same portion reactive functional groups and monomers seen in Examples 1 and 4.

The following components were charged into a 1 liter flask equipped as above to form a graft copolymer solution:

|  | Parts |
| --- | --- |
| Portion 1 | |
| Methylethyl ketone | 200.00 |
| 2-Ethylhexyl methacrylate | 31.73 |
| Hydroxyethyl methacrylate | 36.40 |
| Methyl methacrylate | 20.00 |
| Methacrylic acid | 12.04 |
| Portion 2 | |
| Methylethyl ketone | 35.00 |
| VAZO ®-67 | 5.00 |
| Portion 3 | |
| 2-Ethylhexyl methacrylate | 126.90 |
| Hydroxyethyl methacrylate | 145.60 |
| Methyl methacrylate | 80.00 |
| Methacrylic acid | 48.16 |
| Portion 4 | |
| Methylethyl ketone VAZO ®-52 | 65.00 |
| VAZO ®-67 | 10.00 |

Portion 1 was placed in the reactor and heated to reflux temperature over a period of approximately 20 minutes. Portion 2 was added to Portion 1 over one minute and the reaction was held for 5 minutes. Portions 3 and 4 were added simultaneously to the reaction vessel while maintaining a reflux in the reaction vessel. Portion 3 was added over 240 minutes, and Portion 4 was added over 300 minutes. After the additions of Portions 3 and 4 were completed, the reaction mixture was maintained at reflux for at least 30 minutes and then cooled to room temperature.

The resulting linear, random copolymer solution had a solids content of approximately 58% by weight and had the following overall approximate composition: 33% 2-ethylhexyl methacrylate; 36% hydroxyethyl methacrylate; 18% methyl methacrylate and 12% methacrylic acid.

A waterborne pigment dispersion was prepared by charging the following constituents into an 01-Attritor media mill:

|  | Parts |
| --- | --- |
| Portion 1 | |
| Copolymer prepared above | 59.96 |
| AMP | 6.98 |
| Water | 230.56 |
| Portion 2 | |
| Quinacridone magenta pigment | 52.50 |
| Zirconia media (0.8–1.0 mm) | 850.00 |

The copolymer is neutralized with the AMP to form Portion 1. The material from Portion 1 was mixed with the materials in Portion 2 and the constituents were ground for 16 hours at 500 rpm in an 01-Attritor at 100° F. A uniform, transparent, waterborne pigment dispersion was formed that was stable and deflocculated and had a pH range of 2–4. This dispersion contains 15% pigment and 10% polymer.

This material was used in the following encapsulation reaction.

| Ingredient | Amount |
| --- | --- |
| Waterborne dispersion prepared above (10% polymer, 15% pigment) | 20.00 g |
| m-Tetramethylxylene diisocyanate crosslinker (isocyanate:OH = 1.0:1.0) | 0.7 g |
| Dibutyltin dilaurate (100% solution) | 1 drop |

The above constituents mixed together and heated at 40–50° C., with efficient stirring, for a period of 6 hours. After this time period, the mixture is cooled to room temperature and tested for flocculation stability as in Example 1. The encapsulated samples were more stable.

Example 6

This Example describes the synthesis, dispersion and encapsulation of a graft copolymer with nonionic, hydrophilic arms, and a hydrophobic backbone containing a glycidyl methacrylate functional group. This is an example of an encapsulation reaction using a different type of crosslinker. Nonionic, hydrophilic arms are necessary because the glycidyl methacrylate group would react with the acid groups found in the hydrophilic arms of Example 1.

The following components were charged into a 2 liter flask equipped as above to form a graft copolymer solution:

|  | Parts |
| --- | --- |
| Portion 1 | |
| Bisomer S20W | 60.35 |
| Glycidyl methacrylate | 12.15 |
| n-Butyl acrylate | 18.22 |
| Isopropanol | 440.26 |
| Portion 2 | |
| n-Butyl acrylate | 133.63 |
| Glycidyl methacrylate | 89.09 |
| Bisomer S20W | 442.54 |
| Portion 3 | |
| VAZO ®-52 Initiator | 2.54 |
| Methylethyl ketone | 2.40 |
| Isopropanol | 23.00 |
| Portion 4 | |
| VAZO ®-52 Initiator | 5.08 |
| Methylethyl ketone | 6.11 |
| Isopropanol | 14.64 |

Portion 1 was heated to reflux temperature over a period of approximately 20 minutes. Portions 2 and 3 were added simultaneously to the reaction vessel while maintaining a reflux in the reaction vessel. Portion 2 was added over 180 minutes, and Portion 3 was added over 240 minutes. After the additions of Portions 2 and 3 were completed, Portion 4 was thoroughly mixed and added to the reaction vessel over 15 minutes, maintaining the reflux temperature. After the addition of Portion 4 was completed, the reaction mixture was maintained at reflux for 120 minutes and then cooled to room temperature.

The resulting graft copolymer solution had a solids content of approximately 41% by weight and had the following overall approximate composition: 30% n-butyl acrylate; 20% gylcidyl methacrylate; and 50% bisomer S20W. This material had a weight average molecular weight of about 24000 and a number average molecular weight of approximately 9000.

A waterborne pigment dispersion was prepared by charging the following constituents into an 01-Attritor media mill.

|  | Parts |
| --- | --- |
| Portion 1 | |
| Graft copolymer prepared above | 88.72 |
| Deionized water | 208.78 |
| Portion 2 | |
| Quinacrodone magenta pigment | 52.50 |
| Zirconia media (0.8–1.0 mm) | 850.00 |

The graft copolymer is mixed with deionized water to form Portion 1 (no neutralizing agent is needed). The material from Portion 1 was mixed with the materials in Portion 2 and the constituents were ground for 16 hours at 500 rpm in an 01-Attritor at 100° F. A uniform, transparent, waterborne pigment dispersion was formed that was stable and deflocculated and had a pH range of 2–4. This dispersion contains 15% pigment and 10% polymer.

This material was then encapsulated by a crosslinking reaction between epoxide groups in the backbone and a hydrophobic diamine/catalyst system.

| Ingredient | Amount |
| --- | --- |
| Waterborne dispersion prepared above (10% polymer, 15% pigment) | 20.00 g |
| Norbornenediamine crosslinker (amine:glycidyl methacrylate = 1.0:1.0) | 0.17 g |
| Tributyl amine | 1 drop |

The above constituents mixed together and heated at 40–50° C., with efficient stirring, for a period of 6 hours. After this time period, the mixture is cooled to room temperature and tested for flocculation stability as in previous examples. The encapsulated samples were tested as in Example 1 and were more stable than the non-encapsulated samples.

Example 7

Two inks were prepared from unencapsulated and encapsulated dispersions and a third ink was prepared from a conventional dispersion to test the stability to thermal cycling achieved with the encapsulated dispersion as well as printability in an ink jet printing device.

Dispersion #1 contains a quinacridone magenta pigment and a dispersant of the type prepared in Example 1, the dispersion was prepared using a two roll mill process and was let down into water to 15% by weight pigment and 2.5 parts pigment to 1 part dispersant. Dispersion #2 is dispersion #1 encapsulated using the process described in Example 1. Dispersion #3 uses a conventional methacrylic dispersant and a quniacridone magenta pigment and was prepared using a two roll mill process and was let down into water to 15% pigment and 1.5 parts pigment to 1 part dispersant. Vehicle #1 contains 100 grams of an ethoxylated glycerol, 100 grams of 1,2 hexane diol, 100 grams of diethylene glycol, 27 grams of sodium dioctyl sulfosuccinate and the balance water to a total weight of 1000 grams.

Ink #1 was prepared by adding 11 grams of dispersion #1, 25 grams of vehicle #1 and the balance water to a total of 50 grams. Ink #2 was prepared by adding 11 grams of dispersion #2, 25 grams of vehicle #1 and the balance water to a total of 50 grams. Ink #3 was prepared by adding 11 grams of dispersion #3, 25 grams of vehicle #1 and the balance water to a total of 50 grams.

The inks were then tested in an ink jet printer and all printed well. The inks were also subjected to four freeze—thaw cycles from −20° C. to 60° C. and the change in particle size was observed. While all inks showed an increase in average particle size, the encapsulated sample (Ink #2) increased in size by about 25% versus the 187% increase for Ink #1 and 132% increase for Ink #3. This data indicates that Ink#2 is more stable to thermal cycling.

Example 8

A tint suitable for use in manufacture of paint was prepared to demonstrate the utility of the present invention in such a process. Following the process of Example 1, a dispersion containing copper phthalocyanine blue pigment was prepared, ground and encapsulated. The resulting dispersion was then adjusted to a pH of 9 and the appearance of the dispersion drawdown (i.e., color and haze), and the percentage of solids, were compared to a standard sample.

Following the standardization of the dispersion, it was mixed with a base coat latex, water, a thickener and a biocide. The final solution pH, tinting strength and viscosity were monitored and additional water and/or thickener added to maintain standard viscosity and tint strength.

What is claimed is:

1. A dispersion of particles in a liquid vehicle, comprising:
   (a) a liquid vehicle selected from the group consisting of water, organic solvents and combinations thereof, wherein the vehicle comprises at least 50% by weight of water;
   (b) particles that are at least substantially insoluble in the liquid vehicle;
   (c) a polymer dispersant having at least one segment soluble in the liquid vehicle and at least one segment insoluble in the liquid vehicle, said insoluble segment having cross-linkable moieties; and
   (d) wherein the cross-linkable moieties on the insoluble segment of the polymer dispersant are cross-linked such that the insoluble segment of the polymer dispersant forms a cross-linked polymer matrix with the particles entrapped therein.

2. The dispersion of claim 1, wherein the particle comprises a pigment.

3. The dispersion of claim 1, wherein the cross-linkable moieties on the at least one insoluble segment of the polymer comprise hydroxyl groups and wherein the dispersion further comprises a diisocyante as a cross-linkable component.

4. The dispersion of claim 1, further comprising a cross-linkable component having a cross-linking moiety selected from the group consisting of amine, anhydride, acid, phenolic, hydroxyl, N-methylol, aldehyde, acetoacetoxy, isocyanate, epoxide, ester, isocyanate, aldehyde, activated allyl and water.

5. The dispersion of claim 1, wherein the cross-linkable moieties on the at least one insoluble segment of the polymeric dispersant are selected from the group consisting of epoxy, hydroxyl, anhydride, acid, cyclic carbonate, activated allyl, amine, silane, silicate, silanol, silicone and imine.

6. The dispersion of claim 1, further comprising a catalyst to facilitate cross-linking.

7. The dispersion of claim 6, wherein said catalyst is selected from the group consisting of 2,2,2-diaminobicyclooctane, dibutyltin dilaurate, tributyl amine, trioctyl amine, tridodecyl amine and dimethyldodecyl amine.

8. A dispersion of particles in a liquid vehicle, comprising:
   a) a liquid vehicle selected from the group consisting of water, organic solvents and combinations thereof;
   b) particles that are at least substantially insoluble in the liquid vehicle;
   c) a polymer dispersant having at least one segment soluble in the liquid vehicle and at least one segment insoluble in the liquid vehicle, said insoluble segment having cross-linkable moieties;
   d) wherein the cross-linkable moieties on the insoluble segment of the polymer dispersant are cross-linked such that the insoluble segment of the polymer dispersant forms a cross-linked polymer matrix with the particles entrapped therein; and
   e) wherein the cross-linkable moieties comprise hydroxyl groups and wherein the dispersion further comprises a diisocyanate as a cross-linkable component.

* * * * *